United States Patent
Huang

(10) Patent No.: US 9,864,596 B2
(45) Date of Patent: Jan. 9, 2018

(54) NETWORK SWITCH SYSTEM AND OPERATING METHOD THEREOF

(71) Applicant: ACCTON TECHNOLOGY CORPORATION, Hsinchu (TW)

(72) Inventor: Wei-Hsiang Huang, Hsinchu (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 2 days.

(21) Appl. No.: 14/983,590

(22) Filed: Dec. 30, 2015

(65) Prior Publication Data

US 2016/0210136 A1  Jul. 21, 2016

(30) Foreign Application Priority Data

Jan. 21, 2015 (TW) .............................. 104101996 A

(51) Int. Cl.

| G06F 9/44 | (2006.01) |
| G06F 9/445 | (2006.01) |
| H04L 12/00 | (2006.01) |
| H04L 12/10 | (2006.01) |
| H04L 12/413 | (2006.01) |
| H04L 12/24 | (2006.01) |

(Continued)

(52) U.S. Cl.
CPC ............. *G06F 8/65* (2013.01); *G06F 8/665* (2013.01); *H04L 12/00* (2013.01); *H04L 12/10* (2013.01); *H04L 12/413* (2013.01); *H04L 41/082* (2013.01); *H04L 43/08* (2013.01); *H04L 67/34* (2013.01)

(58) Field of Classification Search
CPC ........................................................ G06F 8/65

USPC .................................. 717/168–178; 709/203
See application file for complete search history.

(56) References Cited

U.S. PATENT DOCUMENTS

| 5,701,411 A * | 12/1997 | Tran .................... G06F 13/4022 |
| | | 709/250 |
| 7,328,434 B2 * | 2/2008 | Swanson ................... G06F 8/64 |
| | | 709/220 |
| 7,586,840 B2 | 9/2009 | Karam |

(Continued)

FOREIGN PATENT DOCUMENTS

EP    2735966 A2    5/2014

OTHER PUBLICATIONS

Berg et al, "Firmware quality assurance", ACM, pp. 3-10, 1982.*

(Continued)

*Primary Examiner* — Anil Khatri
(74) *Attorney, Agent, or Firm* — CKC & Partners Co., Ltd.

(57) ABSTRACT

A network switch system includes a Power-over-Ethernet (PoE) controller, a power sourcing equipment (PSE) controller, and a host computer. The PoE controller is electrically connected to the PSE controller, and stores a loader and a firmware image. The host computer is connected to the PoE controller and stores a second firmware image. The host computer switches the PoE controller to a firmware upgrade mode when the second firmware image is newer than the firmware image. The PoE controller executes the loader in the firmware upgrade mode and overwrites the firmware image with the second firmware image downloaded from the host computer. The PoE controller checks data integrity of the firmware image with an error detection and correction code included in the firmware image, and restarts if no error is found in the firmware image.

18 Claims, 3 Drawing Sheets

(51) Int. Cl.
*H04L 12/26* (2006.01)
*H04L 29/08* (2006.01)

(56) References Cited

U.S. PATENT DOCUMENTS

| | | | | | |
|---|---|---|---|---|---|
| 7,676,803 | B2* | 3/2010 | Zhao | ................... | G06F 8/65 717/168 |
| 8,245,219 | B2* | 8/2012 | Agarwal | ................... | G06F 8/65 717/168 |
| 8,261,256 | B1* | 9/2012 | Adler | ................... | G06F 1/1626 717/173 |
| 8,527,613 | B2* | 9/2013 | Malone | ................... | G06F 9/445 709/220 |
| 8,589,908 | B2* | 11/2013 | Subbakrishna | ........... | G06F 8/65 711/142 |
| 8,677,343 | B2* | 3/2014 | Averbuch | ................ | G06F 8/665 717/170 |
| 8,707,329 | B2* | 4/2014 | Cho | ................... | G06F 9/541 709/206 |
| 8,789,037 | B2* | 7/2014 | De Atley | ............. | G06F 21/577 713/1 |
| 8,887,144 | B1* | 11/2014 | Marr | ................... | G06F 8/65 713/2 |
| 9,418,229 | B2* | 8/2016 | Lau | ................... | G06F 8/665 |
| 9,531,550 | B2* | 12/2016 | Jabbaz | ................... | H04L 12/10 |
| 9,639,342 | B2* | 5/2017 | Kryzer | ................... | G06F 8/65 |
| 2013/0159754 | A1 | 6/2013 | Wendt et al. | | |

OTHER PUBLICATIONS

Li et al, "VIPER: Verifying the Integrity of PERipherals' Firmware", ACM, pp. 3-16, 2011.*

Nguyen et al, "Versioned Hypermedia Can Improve Software Document Management ", ACM, pp. 192-193, 2002.*

Nguyen et al, "The Molhado Hypertext Versioning System", ACM, pp. 185-194, 2004.*

Cadar et al, "Multi-version Software Updates", IEEE, pp. 36-40, 2012.*

Junqueira et al, "A fine-grained and flexible version control for software artifacts", ACM, pp. 185-192, 2008.*

Ahn et al, "Automated Firmware Testing using Firmware-Hardware Interaction Patterns ", ACM, pp. 1-10, 2014.*

* cited by examiner

NETWORK SWITCH SYSTEM AND OPERATING METHOD THEREOF

RELATED APPLICATIONS

This application claims priority to Taiwanese Application Serial Number 104101996, filed Jan. 21, 2015, which is herein incorporated by reference.

BACKGROUND

Field of Invention

The present disclosure is related to a system and method of a network switch system. More particularly, the present disclosure is related to a system and operating method of a network switch system having an automatic firmware upgrade mechanism.

Description of Related Art

With the rapid advance of information technology, power over Ethernet has been widely supported in network systems. Network switch systems with PoE feature supported enable power delivery to powered devices via twisted pair cables, so as to save local power supplies for each powered device respectively. Accordingly, the deployment of the network system is more flexible.

Nonetheless, a firmware is required to bridge the gap between software and hardware, so as to provide an instruction set for enabling power supply services. When the instruction set for the power supply services is updated, the firmware needs to be updated as well. Traditionally, the firmware is updated with in circuit emulator (ICE), and the storage unit of the network switch systems needs to be dismounted during the upgrading process. Therefore, the upgrading process wastes both labor and time and causes inconvenience. When a network switch system supplier intends to upgrade all systems sold to the clients, a huge amount of operating cost is incurred.

SUMMARY

An aspect of the present disclosure is directed to a network switch system. The network switch system includes a Power-over-Ethernet (PoE) controller and a host computer. The PoE controller is configured for storing a firmware image. The host computer is connected to the PoE controller and configured to store a second firmware image. The host computer is configured for comparing versions of the firmware image in the PoE controller and in the host computer. When the version of the second firmware image is newer than the version of the firmware image, the host computer switches the PoE controller to enter a firmware upgrade mode.

Another aspect of the present disclosure is directed to an operating method of a network switch system. The operating method includes the following operations: comparing a version of a firmware image in a PoE controller with a version of a second firmware image in a host computer; switching the PoE controller to enter a firmware upgrade mode when the version of the second firmware image is newer than the version of the firmware image; executing a loader after entering the firmware upgrade mode and downloading the second firmware image from the host computer to overwrite the firmware image by the second firmware image; restarting the PoE controller after finishing overwriting the firmware image, and then the PoE controller loads and executes the second firmware image after restarting the PoE controller.

Again another aspect of the present disclosure is directed to a network switch system. The network switch system includes a power sourcing equipment (PSE) controller, a PoE controller and a host computer. The PSE controller is configured for providing power supply through at least one network transmission line to at least one powered device. The PoE controller is configured for controlling the PSE controller and storing a firmware image. The host computer is connected to the PoE controller and configured for switching the PoE controller to enter a firmware upgrade mode when the host computer identifies that a version of a second firmware image in the host computer is newer than a version of the firmware image in the PoE controller.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
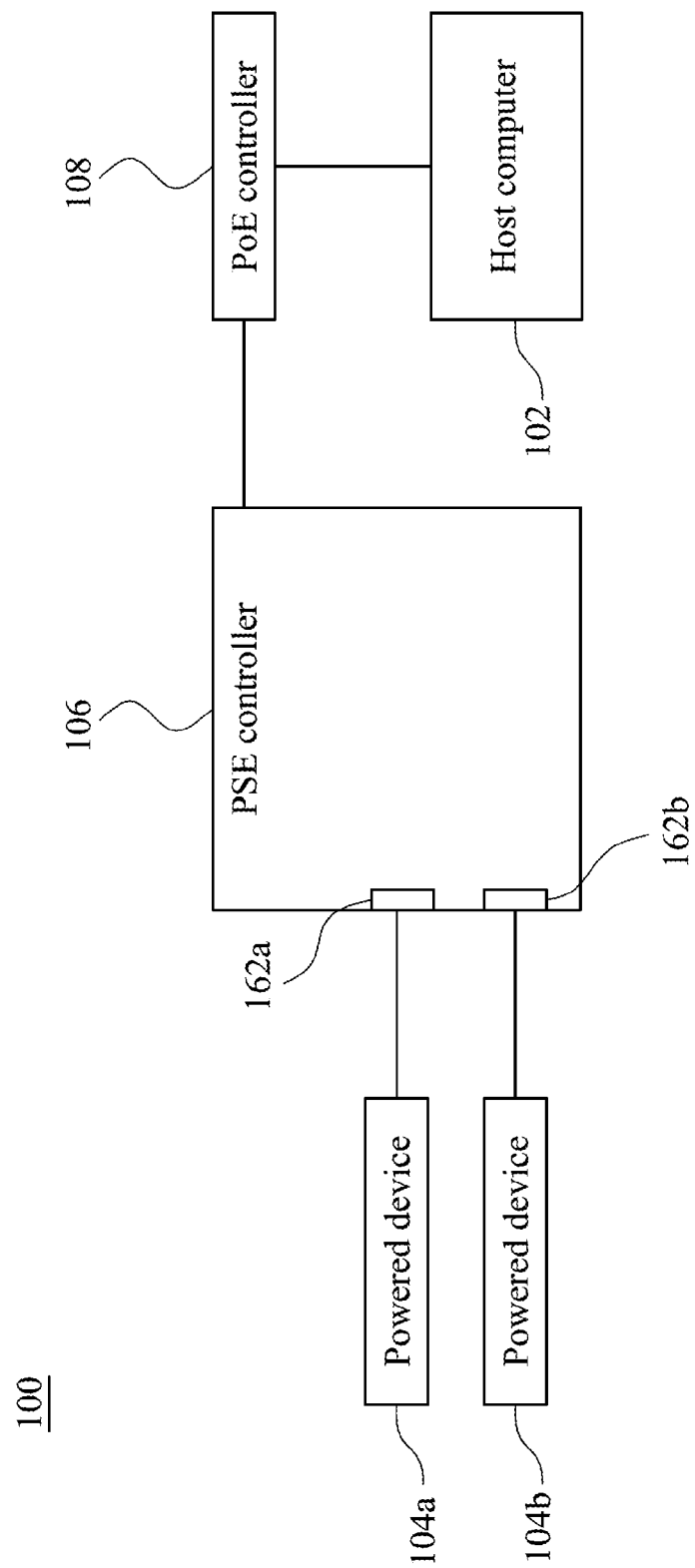
FIG. 1 is a block diagram of a network switch system according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a block diagram of a network switch system according to a first embodiment of the present disclosure. The network switch system 100 includes a host computer 102, a powered device 104a, another powered device 104b, a power sourcing equipment (PSE) controller 106 and a power over Ethernet (PoE) controller 108. The PoE controller 108 is connected to the host computer 102 and is electrically connected with the PSE controller 106. The PSE controller 106 is connected with the powered devices 104a-104b through network transmission lines. The network transmission lines may be a CAT-3 cable, a CAT-5 cable or a CAT-5e cable.

The host computer 102 may be a server, a mainframe computer or a network switch system server. The powered devices 104a-104b receive power transmitted through the network transmission lines from network connection ports. The powered devices 104 may be an IP telephone, an IP camera, or a wireless access point.

The PSE controller 106 includes multiple network connection ports 162a-162b respectively connected with the powered devices 104a-104b with the network transmission lines. The PSE controller 106 may be implemented with various kinds of hardware, such as a microcontroller, a system on a chip (SoC), a field programmable gate array (FPGA), an application-specific integrated circuit (ASIC), or the combination thereof.

Functions of the PoE controller 108 include controlling the PSE controller 106 to provide at least one power supply service to the powered devices 104a-104b and determining whether the PSE controller 106 is to supply power to the powered devices 104a-104b. Specifically, the PSE controller 106 is connected to the powered devices 104a-104b through the network transmission line from the network connection ports 162a-162b, and the PSE controller 106 transmits power to the powered devices 104a-104b through the network transmission lines. The PoE controller 108 may be implemented with various kinds of hardware, such as a microcontroller, a system on a chip (SoC), a field programmable gate array (FPGA), an application-specific integrated circuit (ASIC), or the combination thereof.

The PoE controller 108 includes a loader and a firmware image. The loader and the firmware image are stored in a storage unit electrically connected with the PoE controller 108, such as a flash memory or a read-only memory. The read-only memory may be a programmable read-only memory (PROM), an electrically alterable read-only memory (EAROM), or an electrically erasable programmable read-only memory (EEPROM).

The loader is loaded and executed by the PoE controller 108 to check the version of firmware image. Specifically, the PoE controller 108 executes the loader to determine whether the version of firmware image is different from a version of firmware image released by the host computer 102. In one embodiment, the PoE controller 108 loads and executes the loader to check the version of firmware image stored in the host computer 102 periodically. According to checking result, the PoE controller 108 selectively updates the firmware image based on a version of firmware image released by the host computer 102.

The PoE controller 108 is configured to load and execute the loader upon power up to perform initialization and hardware checks, and then the loader is configured to load the firmware image for execution. The firmware image includes an instruction set with commands for controlling the PSE controller 106 to provide the power supply services to the powered devices 104a-104b. Specifically, after the initialization and the hardware checks are performed by the loader, the PoE controller 108 controls the PSE controller 106 to transmit power to the powered devices 104a-104b through the network transmission lines. In one embodiment, the instruction set may be a binary matrix, and each element (e.g., binary number "0" or "1") in the binary matrix represents whether the powered device should be powered or not. For illustration, when the binary matrix is a 2-by-1 matrix, the element in the first row and first column and the element in the first row and second column in the binary matrix represent whether the powered device 104a and the powered device 104a should be powered or not respectively. When the element in the first row and first column has a binary number of 1, the powered device 104a will be powered by the PSE controller 106. In contrast, when the element in the first row and first column has a binary number of 0, the powered device 104a will not be powered. Such arrangement can be applied to the powered device 104b.

For illustration, the host computer 102 stores a second firmware image in various storage units. For example, the storage units include a flash memory, a hard disk, a floppy disk, an optical disc, or a USB memory device. The second firmware image is the most up-to-date firmware image, and the host computer 102 switches the PoE controller 108 to enter a firmware upgrade mode if the version of the second firmware image is newer than the version of the firmware image. The detail process of entering the firmware upgrade mode is shown in the following paragraphs.

In an embodiment, the host computer 102 is configured to obtain a version number of the firmware image stored in the PoE controller 108, which is currently installed in the PoE controller 108, at cold booting and compare the version number of the firmware image with another version number of the second firmware image. When the version numbers are incremented numerically, the host computer 102 determines which is newer by telling which version number is bigger. For example, when the version number of the firmware image is XXX001, and the version number of the second firmware image is XXX003, the host computer 102 identifies, after comparison, that the last digit of the version number of the second firmware image is bigger than that of the version number of the firmware image, and thus the second firmware image is newer. The version numbers listed herein are by examples, and the present disclosure is not limited hereto. The second firmware image is an updated firmware image released by chip manufacturers or a customized firmware image customized to the need of the client by the chip manufacturer. The host computer 102 determines which firmware image is newer by the comparison result of the version numbers. For example, the version number is expressed in decimal format, the major version number and the minor version number are delimited with a decimal mark (or decimal point). When comparing the version numbers to notify which one is newer, the major version numbers are firstly compared and the version number with the bigger major version number is newer. When the major version numbers are the same, the minor version numbers are then compared, and the version number with the bigger minor version number is newer.

For example, if the version number of the firmware image stored in the PoE controller 108 is 100-001 (the former part of 100-001 (i.e., 100) is the major version number, and the latter part of 100-001 (i.e., 001) is the minor version number), and the version number of the second firmware image is 100-003, the host computer 102 firstly compares the major version numbers of the firmware image and the second firmware image. After the comparison of the major version numbers, the host computer 102 identifies that the major version number of firmware image is, for example, the same as the second firmware image, and the host computer 102 therefore compares the minor version numbers of the firmware image and the second firmware image. Afterwards, the host computer 102 identifies that the minor version number of firmware image is smaller than that of the second firmware image, i.e., the version of second firmware image is newer than the firmware image. Once the version of second firmware image is newer than the firmware image, the host computer 108 switches the PoE controller 108 to enter a firmware upgrade mode. The aforementioned operations are given for illustrative purposes. Various operations are within the contemplated scope of the present disclosure. For example, in another embodiment, version numbers of the firmware image and the second firmware image are exchanged, and the aforementioned operations are modified accordingly.

When the second firmware image is newer than the firmware image, the host computer 102 switches the PoE controller 108 to enter a firmware upgrade mode. In another embodiment, the host computer 102 is configured to perform comparison of the version numbers when the second firmware image stored is changed.

After the PoE controller 108 enters the firmware upgrade mode, it loads the loader to perform basic communication and data reading/writing functions, and downloads the second firmware image from the host computer 102 to overwrite the firmware image. Illustratively, the second firmware image is written to the memory blocks originally reserved for the firmware image on the storage unit of the PoE controller 108 to replace the firmware image, such that the PoE controller 108 loads the second firmware image. The PoE controller 108 is configured to restart after finishing overwriting.

In an embodiment, the host computer 102 is connected with the PoE controller 108 via a universal asynchronous receiver/transmitter (UART) interface. The communication protocol for the UART interface adopts serial transmission, and serial communication does not require support of high level software. Therefore, the functions of basic communication and data read/write supported by the loader are sufficient for transmitting data with serial transmission.

In another embodiment, the second firmware image further includes an error detection and correction code. After the PoE controller 108 downloads the second firmware image and overwrites the firmware image with the second firmware image, the firmware image also copies the error detection and correction code. The PoE controller 108 checks data integrity with the error detection and correction code, and restarts the PoE controller 108 when the data is not corrupted. The error detection and correction code is a parity check code, a cyclic redundancy check code, or a checksum.

In yet another embodiment, the PoE controller 108 checks whether the version number of the second firmware image and the version number of the firmware image are the same after restart. When the version numbers are not identical, the data of the firmware image might be corrupted. As a result, the power supply services are terminated by the PSE controller 106, so as to avoid damaging the powered devices 104a-104b.

After the PoE controller 108 restarts, the firmware image is the up-to-date version, and the instruction set included in the firmware image is updated to provide comprehensive power supply services. The power supply services include current measurement, voltage measurement, power measurement, temperature measurement, and obtaining power status data.

In one embodiment, the power status data obtained with the power supply services include whether the powered devices 104a-104b have local power supply. The power status data are obtained according to the link layer discovery protocol (LLDP) packets received with the network connection ports 162a-162b, and the power status data for the powered devices 104a-104b are obtained respectively from the network connection ports 162a-162b. The power status data includes whether the powered devices 104a-104b have local power supplies, and the PoE controller 108 terminates the power supply to the powered device with a local power supply, so as to reduce the output power of the PoE controller 108.

In another embodiment, the power supply services include calculating an output power sum of supplied power to the powered devices 104a-104b. The PoE controller 108 controls the PSE controller 106 to calculate the output power sum of supplied power to the powered devices 104a-104b from the network connection ports 162a-162b every predetermined interval (e.g., 2 seconds). The output power sum is transmitted back to the host computer 102 for power consumption analysis.

In yet another embodiment, the power supply services include calculating an output power sum of supplied power to the powered devices 104a-104b, and adjusting the output power individually supplied to the powered devices 104a-104b according to the power status data of the powered devices 104a-104b when the output power sum exceeds a predetermined threshold. The predetermined threshold is set according to the maximum power that the PSE controller 106 can provide, so as to avoid damaging the PSE controller 106 due to overload. Additionally or alternatively, the predetermined threshold is set according to the energy usage plan of the user.

For example, the network connection port 162a provides an output power of 30 Watts to the powered device 104a; the network connection port 162b provides an output power of 30 Watts to the powered device 104b; and the predetermined threshold is 50 Watts. When the power status data of the powered device 104a indicate the presence of a local power supply for the powered device 104a, the PoE controller 108 controls the PSE controller 106 to stop supplying power to the network connection port 162a, so as to avoid the output power sum exceeding the predetermined threshold.

It is worth noting that numbers of the network connection ports 162a-162b and the power devices 104a-104b are by example, and should not be used to limit the scope of the present disclosure. Other implementations of the network switch system 100 that match the features described in the present disclosure fall in the scope of the present disclosure.

Figure 2:
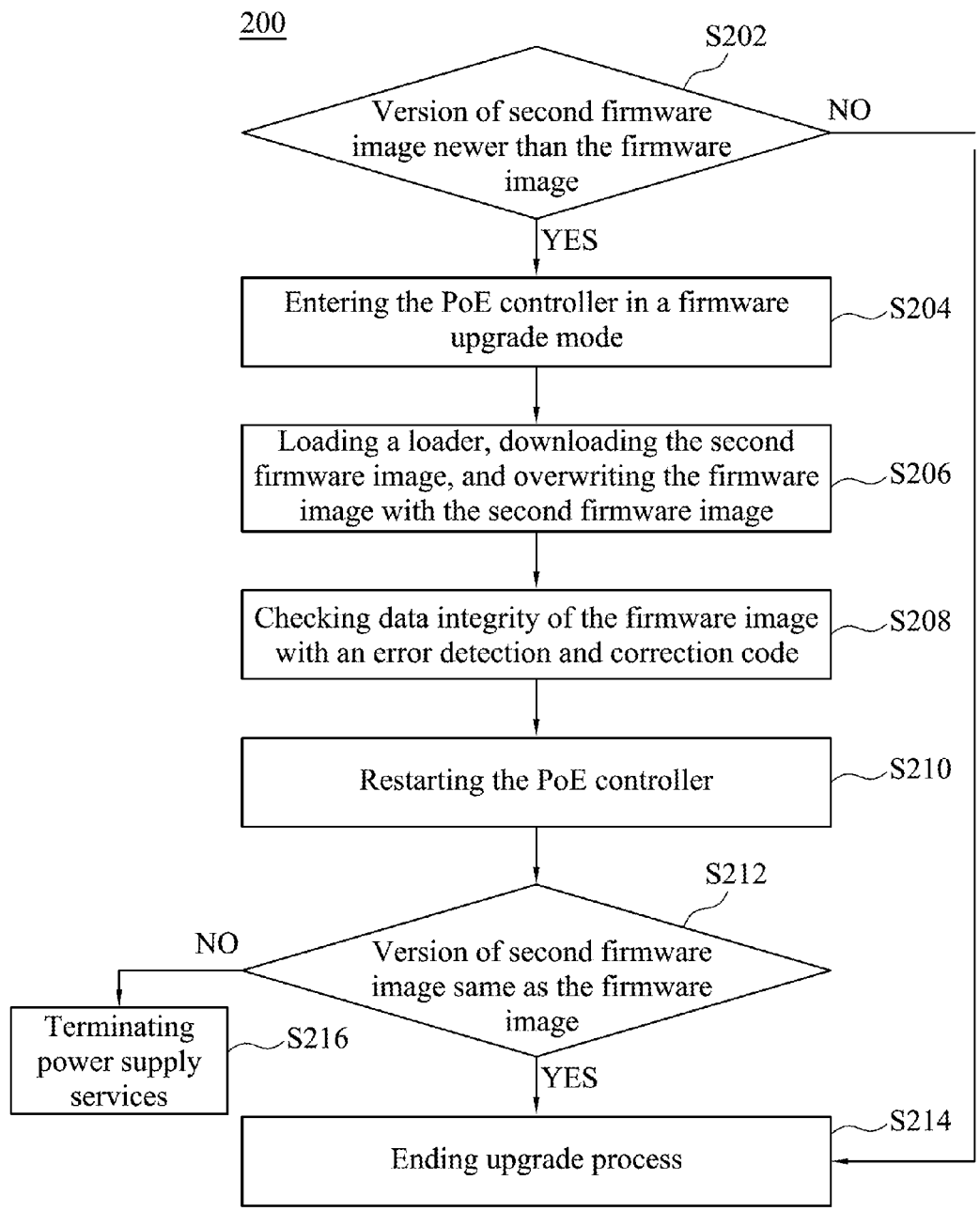
FIG. 2 is flow chart of an operating method of a network switch system according to a second embodiment of the present disclosure.

Further details of the present disclosure are provided with FIG. 2, which illustrates an operating method of a network switch system. It is worth noting that the operating method of the network switch system is applicable to the network switch system 100 shown in FIG. 1. For the purpose of understanding and convenience, the following description takes the network switch system 100 in FIG. 1 as an example to explain the operating method of the network switch system, but the disclosure is not limited thereto.

Moreover, it is also worth noting that the order of the operations of the method for supplying power presented in the present disclosure can be adjusted according to the application scenarios unless specified otherwise, and all or part of the operations can be performed simultaneously. In different embodiments, the operations can be added, replaced, or omitted.

FIG. 2 is flow chart of an operating method of a network switch system according to a second embodiment of the present disclosure. The operating method 200 of the network switch system includes the following operations.

In operation S202, the host computer 102 compares a version of a firmware image stored on the PoE controller 108 with another version of the second firmware image stored on the host computer 102. In one embodiment, the host computer 102 compares the version difference with version numbers of the firmware image and the second firmware image.

When the version of the second firmware image is newer than the version of the firmware image, the PoE controller 108 is switched to enter a firmware upgrade mode (operation S204). When otherwise, the host computer 102 ends the upgrade process (operation S214). In an embodiment, the host computer 102 is connected with the PoE controller 108 with an UART interface and transmits signals with the UART interface to switch the PoE controller 108 to enter a firmware upgrade mode.

In operation S206, the PoE controller 108 executes a loader after entering the firmware upgrade mode, downloads the second firmware image from the host computer 102, and overwrites the firmware image with the second firmware image. The details are given in the above-described first embodiment, and not repeated herein.

Operation S208 is performed after finishing overwriting, and in which an error detection and correction code included in the second firmware image is used to confirm that no data corruption of the firmware image happens during downloading and overwriting. When the data of the firmware image is corrupted and non-restorable, the PoE controller 108 controls the PSE controller 106 to terminate the power supply services. The details are given in the above-described first embodiment, and not repeated herein.

In operation S210, the PoE controller 108 is restarted and the loader loads the updated firmware image. The loader loads the updated firmware image after initialization, so as to enable the PoE controller 108 to control the PSE controller 106 to provide the power supply services to the powered device 104*a*-104*b*.

In operation S212, the version of the second firmware image stored on the host computer 102 is compared with the version of the firmware image again to check whether they are identical. When the versions are identical, the firmware image is successfully updated and the firmware upgrade process is ended (operation S214). The updated firmware image includes the up-to-date instruction set to provide new power supply services. When the versions are not identical, the upgrade process might fail, and the power supply services provided by the PSE controller 106 are terminated (operation S216), so as to avoid damaging the powered devices 104*a*-104*b*.

Figure 3:
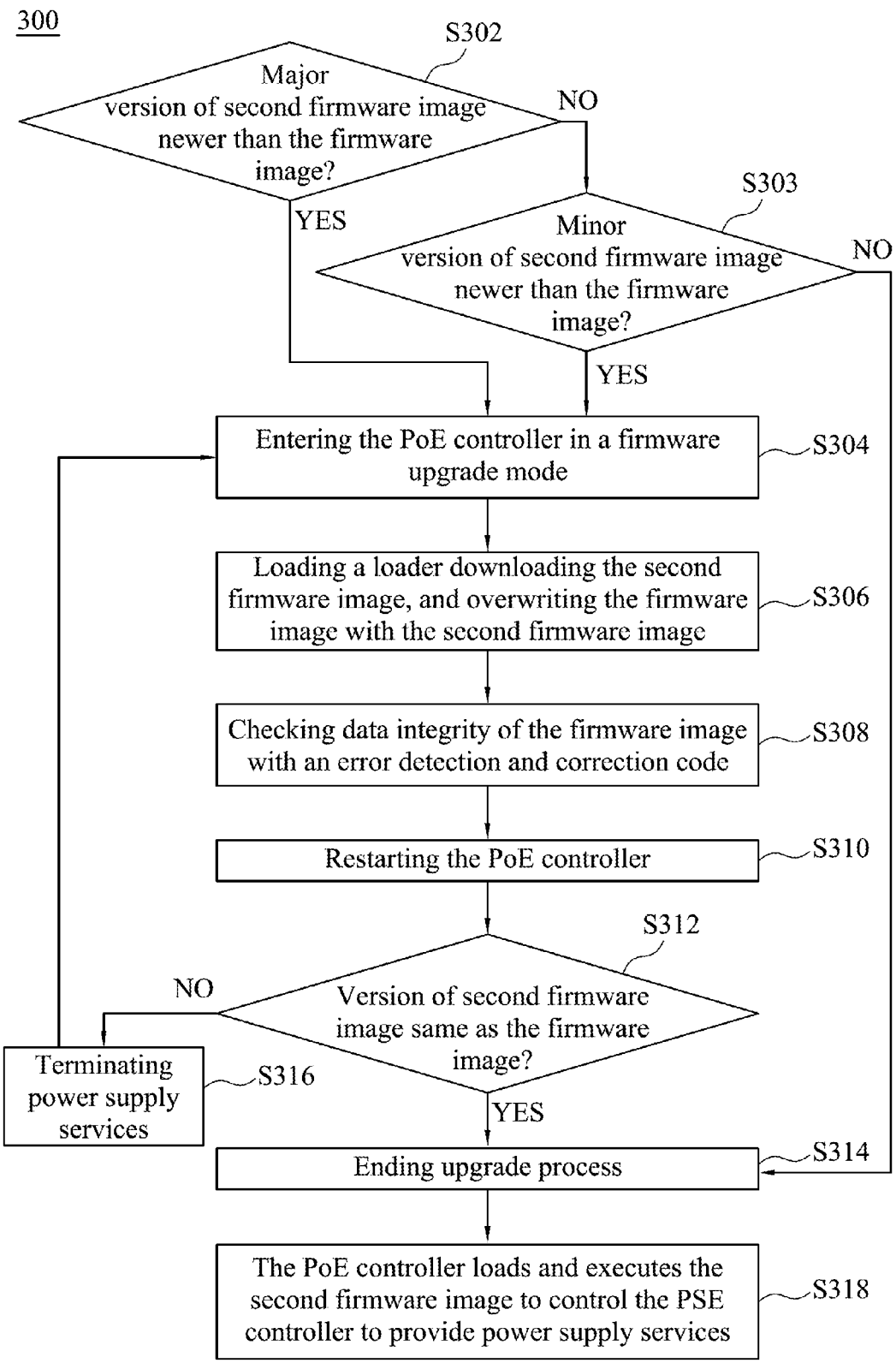
FIG. 3 is flow chart of an operating method of the network switch system according to a third embodiment of the present disclosure.

FIG. 3 is flow chart of an operating method of a network switch system according to a third embodiment of the present disclosure. The operating method 300 of the network switch system includes the following operations.

In operation S302, the host computer 102 compares a major version of a firmware image stored on the PoE controller 108 with another version of the second firmware image stored on the host computer 102. Specifically, the host computer 102 compares the version difference with major version numbers of the firmware image and the second firmware image.

When the major version of the second firmware image is newer than the version of the firmware image, the PoE controller 108 is switched to enter a firmware upgrade mode (operation S304). Otherwise, the host computer 102 continues comparing the minor version of the firmware image with that of the second firmware image (operation S303).

In operation S303, the host computer 102 compares a minor version of a firmware image stored on the PoE controller 108 with another version of the second firmware image stored on the host computer 102. Specifically, the host computer 102 compares the version difference with minor version numbers of the firmware image and the second firmware image. For example, the version number is expressed in decimal format, the major version number mentioned in operation S302 and the minor version number mentioned in operation S302 are delimited with a decimal mark (or decimal point).

When the minor version of the second firmware image is newer than the version of the firmware image, the PoE controller 108 is switched to enter a firmware upgrade mode (operation S304). Otherwise, the host computer 102 ends the upgrade process (operation S314).

In operation S306, the PoE controller 108 executes a loader after entering the firmware upgrade mode, downloads the second firmware image from the host computer 102, and overwrites the firmware image with the second firmware image. The details are given in the above-described first embodiment, and not repeated herein.

Operation S308 is performed after finishing overwriting, and in which an error detection and correction code included in the second firmware image is used to confirm that no data corruption of the firmware image happens during downloading and overwriting. When the data of the firmware image is corrupted and non-restorable, the PoE controller 108 controls the PSE controller 106 to terminate the power supply services. The details are given in the above-described first embodiment, and not repeated herein.

In operation S310, the PoE controller 108 is restarted and the loader loads the updated firmware image. The loader loads the updated firmware image after initialization so that the PoE controller 108 controls the PSE controller 106 to provide the power supply services to the powered device 104*a*-104*b*.

In operation S312, the version of the second firmware image stored on the host computer 102 is compared with the version of the firmware image again to check whether both versions are identical. When the versions are identical, the firmware image is successfully updated, and the firmware upgrade process is ended (operation S314), the PoE controller 108 then loads and executes the second firmware image (operation S318). The updated firmware image includes the up-to-date instruction set to provide new power supply services. When the versions are not identical, the upgrade process might be terminated, and the power supply services provided by the PSE controller 106 are terminated (operation S316), so as to avoid damaging the powered devices 104*a*-104*b*. Afterward, the PoE controller 108 is switched to enter a firmware upgrade mode again (operation S304).

In operation S318, since the firmware image is the same as the second firmware image, the PoE controller 108 therefore loads and executes the updated firmware image (i.e., second firmware image) to control the PSE controller 106 to provide power supply services for the powered devices 104*a*-104*b* through network transmission lines.

In some embodiments, when the version of the second firmware image and the firmware image are not identical in operation S312, the host computer 102 executes the operation S312 again to check the version of the second firmware image with that of the firmware image. If the versions are identical, the firmware image is successfully upgraded and the firmware upgrade process is ended (operation S314); otherwise, the upgrade process might be terminated, and the power supply services provided by the PSE controller 106 are terminated (operation S316).

In some embodiments, when the major versions are identical but the minor version are not identical in operation S312, the firmware image still can be considered to be successfully updated due to capability of the PoE controller 108 to operate, and the firmware upgrade process is ended (operation S314). For illustration, the major versions represent a necessary upgraded version (e.g., support new functions), and the minor versions represent a selective upgraded version (e.g., improve compatibility for various devices). For example, in another embodiment, the major versions and the minor versions are exchanged, and the aforementioned operations are modified accordingly.

The power supply services provided with the updated firmware image are detailed in the descriptions of the first embodiment. The PSE controller 106 is capable of measuring the current, voltage, temperature, and other power status of the powered devices. In addition to the power supply services described in the aforementioned embodiments, the PoE controller 108 may manage other status of the powered devices which receive power from the PSE controller 106.

For example, the power delivery is terminated when the operating temperature of the power device is higher than a predetermined value. Additionally or alternatively, when the voltage of the powered device is not stable, the PoE controller 108 may issue a warning to alert the maintenance workers to perform repair work.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A network switch system, comprising:
    a Power-over-Ethernet (PoE) controller configured for storing a firmware image; and
    a host computer connected to the PoE controller and configured for storing a second firmware image;
    wherein the host computer is configured for comparing a version of the firmware image in the PoE controller with a version of the second firmware image in the host computer,
    when the host computer identifies that the version of the second firmware image is newer than the version of the firmware image by comparing the version of the firmware image with the version of the second firmware image, the host computer switches the PoE controller to enter a firmware upgrade mode;
    wherein the PoE controller is further configured for storing a loader and executing the loader after entering the firmware upgrade mode,
    downloading the second firmware image from the host computer to overwrite the firmware image, and restarting the PoE controller after finishing overwriting the firmware image.

2. The network switch system of claim 1, wherein the host computer is a network switch system server.

3. The network switch system of claim 1, wherein the firmware image includes an instruction set for providing at least one power supply service, and the at least one power supply service includes obtaining a plurality of power status data of at least one powered device and calculating an output power sum of supplied power to the at least one powered device.

4. The network switch system of claim 3, wherein the at least one power supply service includes adjusting an output power supplied to the at least one powered device according to the power status data of the at least one powered device when the output power sum exceeds a predetermined threshold.

5. An operating method of a network switch
    comparing a version of a firmware image in a PoE controller with a version of a second firmware image in a host computer;
    switching the PoE controller to enter a firmware upgrade mode if the host computer Identifies that the version of the second firmware image is newer than the version of the firmware image by comparing the version of the firmware image with the version of the second firmware image;
    executing a loader after entering the firmware upgrade mode, and downloading the second firmware image from the host computer to overwrite the firmware image by the second firmware image; and
    restarting the PoE controller after finishing overwriting the firmware image, wherein the PoE controller loads and executes the second firmware image after restarting the PoE controller;
    wherein the PoE controller is further configured for storing a loader and executing the loader after entering the firmware upgrade mode,
    downloading the second firmware image from the host computer to overwrite the firmware image, and restarting the PoE controller after finishing overwriting the firmware image.

6. The operating method as claimed in claim 5, wherein the firmware image includes an instruction set for providing at least one power supply service, and the at least one power supply service includes obtaining a plurality of power status data of at least one powered device and calculating an output power sum of supplied power to the at least one powered device.

7. The operating method as claimed in claim 6, wherein the at least one power supply service further includes adjusting an output power supplied to the at least one powered device according to the power status data of the at least one powered device if the output power sum exceeds a predetermined threshold.

8. A network switch system, comprising: a power sourcing equipment (PSE) controller configured for providing power supply through at least one network transmission line to at least one powered device;
    a Power-over-Ethernet (PoE) controller configured for controlling the PSE controller, wherein the PoE controller stores a firmware image; and
    a host computer connected to the PoE controller, and configured for switching the PoE controller to enter a firmware upgrade mode,
    when the host computer identifies that a version of a second firmware image in the host computer is newer than a version of the firmware image in the PoE controller by comparing the version of the firmware Image with the version of the second firmware image;
    wherein the PoE controller is further configured for storing a loader and executing the loader after entering the firmware upgrade mode,
    downloading the second firmware image from the host computer to overwrite the firmware image, and restarting the PoE controller after finishing overwriting the firmware image.

9. The network switch system of claim 8, wherein the PSE controller comprises a plurality of network connection ports configured to be connected to the at least one powered device through the at least one network transmission line, and the PSE controller is configured for providing power supply from the network connection ports through the at least one network transmission line to the at least one powered device.

10. The network switch system of claim 8, wherein after the PoE is restarted, the PoE controller is configured to load and execute the second firmware image.

11. The network switch system of claim 8, wherein the host computer is a network switch system server.

12. The network switch system of claim 8, wherein the firmware image includes an instruction set for providing at least one power supply service, and the at least one power supply service includes obtaining a plurality of power status data of the at least one powered device and calculating an output power sum of supplied power to the at least one powered device.

13. The network switch system of claim 12, wherein the at least one power supply service includes adjusting an output power supplied to the at least one powered device according to the power status data of the at least one powered device when the output power sum exceeds a predetermined threshold.

14. The network switch system of claim 8, wherein the host computer is further configured for comparing the version of the second firmware image in the host computer with the version of the firmware image in the PoE controller.

15. The network switch system of claim 14, wherein the host computer is further configured for comparing at least one digit number of the version of the second firmware image in the host computer and at least one digit number of the version of the firmware image in the PoE controller.

16. The network switch system of claim 8, wherein the host computer is a network switch system server, and the PSE controller is configured for providing power supply from network connection ports therein to the at least one powered device.

17. The network switch system of claim 8, wherein the host computer is further configured for comparing at least one digit number of the version of the second firmware image in the host computer and at least one digit number of the version of the firmware image in the PoE controller, to determine if the host computer identifies that the version of the second firmware image in the host computer is newer.

18. The network switch system of claim 8, wherein at least one of the PSE controller and PoE controller is implemented by a microcontroller, a system on a chip (SoC), a field programmable gate array (FPGA), an application-specific integrated circuit (ASIC), or the combination thereof.

* * * * *